United States Patent Office 2,998,399
Patented Aug. 29, 1961

2,998,399
POLYISOCYANATE, POLYESTER REACTION PRODUCT AND PROCESS
John C. Petropoulos, Norwalk, Conn., assignor to American Cyanamid Company, New York, N.Y., a corporation of Maine
No Drawing. Filed Feb. 11, 1957, Ser. No. 639,204
18 Claims. (Cl. 260—22)

This invention relates to a novel class of resinous compositions comprising the reaction product of polyisocyanates and certain dibenzoic acids and derivatives thereof and to the process of preparing the same. Still further, this invention relates to novel resinous compositions comprising the interreaction product of polyisocyanates and polyester resins prepared by reacting a polyhydric alcohol, with or without a glyceride oil modifier and certain alkylidene dibenzoic acids and to the process of preparing the same.

One of the objects of the present invention is to produce a novel class of resinous compositions comprising the interreaction product of polyisocyanates with alkylidene bis benzoic acids and the polyesters thereof.

A further object of the present invention is to produce a novel class of resinous compositions which will be useful as foams, both rigid and flexible, coating compositions, adhesives, molding compositions, laminating compositions and the like. These and other objects of the present invention will be discussed in greater detail hereinbelow.

The novel dicarboxylic acids used in the present invention may be illustrated by the general formula:

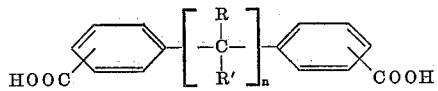

wherein R and R' are alkyl groups containing 1 to 4 carbon atoms and $n$ is a whole number between 1 and 2, inclusive. These acids are shown in considerable detail as well as the process of preparing the same in my earlier application having the Serial No. 523,355, filed July 20, 1955, now U.S. Patent 2,848,486, entitled "Novel Products and Process for Preparing the Same," of which the instant application is a continuation-in-part.

In order that the preparation of these novel alkylidene bis benzoic acids may be more completely understood, the following examples are set forth in which all parts are parts by weight unless otherwise indicated.

4,4'-(2,2-BUTYLIDENE)DIBENZOIC ACID

Into a suitable reaction vessel equipped with thermometer, stirrer and reflux codenser, there is introduced 10 parts of 2,2-di(p-tolyl)butane, 300 parts of acetic acid, 300 parts of water, 90 parts of concentrated sulfuric acid and 70 parts of chromic acid. The mixture is heated to reflux temperature and maintained at that temperature for about 10 hours. On diluting the reaction mixture with water, 7 parts of a solid material precipitated. After purification by recrystallization from alcohol, this solid material melted at 267° C. uncorrected, and had a neutral equivalent of 150 (theoretical = 149). The product produced is identified as 4,4'-(2,2-butylidene)dibenzoic acid.

4,4'-(3,3-PENTYLIDENE)DIBENZOIC ACID

Into an autoclave equipped as in Example 1, there is introduced 25.2 parts of 3,3-di-p-tolyl-pentane, 30.6 parts of concentrated nitric acid and 61 parts of water. The reactants are heated to 160° C., whereupon the reaction becomes exothermic and the temperature rises to about 185–190° C. The reactants are held at 175–190° C. for about 30 minutes, whereupon the charge is cooled to room temperature and the reactants discharged. The yield is approximately 87% of theoretical and the product produced is a light tan solid which melts at about 255–285° C. After several recrystallizations from acetic acid, the melting point is determined at 305–6° C., uncorrected. The product produced is 4,4'-(3,3-pentylidene)dibenzoic acid. Analysis.—Calculated for $C_{19}H_{20}O_4$: C, 73.06; H, 6.45; neutral equivalent 156. Found: C, 73.11; H, 6.65, neutral equivalent 153.

4,4'-(ISOPROPYLIDENE)DIBENZOIC ACID

The first example hereinabove is repeated in all essential details except that the ditolyl alkane which is oxidized is 2,2-di(p-tolyl)propane to produce the corresponding acid, namely, 4,4'-(isopropylidene)dibenzoic acid.

Among the alkylidene dibenzoic acids which may be used in accordance with the concepts of the present invention are: 4,4'-isopropylidene-dibenzoic acid; 4,4'-(2,2-butylidene)dibenzoic acid; 4,4'-(1,1,2,2-tetramethylethylene)dibenzoic acid; 4,4' - (1,1,2,2-tetraethylethylene)dibenzoic acid; 4,4' - (1,1,2,2 - tetrapropylethylene)dibenzoic acid; 4,4'-(1,1,2,2-tetrabutylethylene)dibenzoic acid; 3,3' - isopropylidenedibenzoic acid; 2,2'-isopropylidenedibenzoic acid; 4,4' - (1,2-diethyl-1,2-dimethylethylene)dibenzoic acid; 2,2'-(1,1,2,2-tetraethylethylene)dibenzoic acid; 2,2'-(1,1,2,2-tetrabutylethylene)dibenzoic acid; 4,4'-(2,2-butylidene)dibenzoic acid; 3,3'-(2,2-butylidene)dibenzoic acid; 2,2'-(2,2-butylidene)dibenzoic acid; 4,4'-(2,2-pentylidene)dibenzoic acid; 3,3'-(2,2-pentylidene)dibenzoic acid; 2,2'-(2,2-pentylidene)dibenzoic acid; 4,4'-(3,3-pentylidene)dibenzoic acid; 3,3'-(3,3-pentylidene)dibenzoic acid; 2,2'-(3,3-pentylidene)dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,3'-(3,3-heptylidene)dibenzoic acid; 4,4'-(4,4-heptylidene)dibenzoic acid; 4,4'-(4,4-octylidene)dibenzoic acid; 3,3'-(4,4-octylidene)dibenzoic acid; 2,2'-(4,4-octylidene)dibenzoic acid; 4,4'-(5,5-nonylidene)dibenzoic acid; 3,3'-(5,5-nonylidene)dibenzoic acid; 2,2'-(5,5-nonylidene)dibenzoic acid.

In order that the present invention may be completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with thermometer, stirrer and reflux condenser, there is introduced 29.8 parts of 4,4'-(2,2-butylidene)dibenzoic acid, 268 parts of methylisobutyl ketone and 16.8 parts of hexamethylene diisocyanate. The charge is heated gradually with constant stirring up to the reflux temperature and is held at that temperature with constant stirring for about 30 hours. At that point, the evolution of carbon dioxide gas had substantially completely ceased and the reaction product of the dibenzoic acid and the diisocyanate had precipitated from the solvent. The precipitated material is then filtered and dried. 20 parts of the reaction product, thus recovered, are dissolved in 80 parts of dioxane and stirred until solution is substantially completed. A plurality of films are drawn down on glass panels. One of the films was permitted to air dry for a period of about 1 hour to 1½ hours to produce a film which was tough, hard, glossy and tack-free. A second film was subjected to heat over a steam bath in order to accelerate the drying rate of the film and, in this instance, the film dried to a tack-free condition in about 15 to 20 minutes. The resultant film again was tough, hard and glossy.

ALKYD RESIN A

Into a suitable reaction vessel equipped with thermometer, stirrer and inlet and outlet tubes for the passage of inert gases therethrough, there is introduced 298 parts of 4,4'-(2,2-butylidene) dibenzoic acid, 168 parts of lauric acid and 112 parts of glycerin. The reaction mixture is heated to between 220 and 230° C. until esterification is substantially completed. The resulting short-oil alkyd resin is characterized by an acid number of 9.8, a Gardner-Holdt viscosity of $Z_+$ at 60% solids in xylol and a Gardner 1933 color of between 3 and 4 as read on a 60% xylol solution.

Example 2

20 parts (solids) of the alkyd resin A as a 60% solids solution in xylene are blended with 1 part of a 2,4-toluene diisocyanate. After sufficient stirring to disperse the components into a solution, a plurality of films are cast on a glass plate. One is dried and cured by baking for 1 hour at 150° C. The baked film thus produced is clear, tough, hard and glossy. A second film was allowed to air dry overnight to produce a film with comparable properties.

ALKYD RESIN B

Into a suitable reaction vessel equipped as in alkyd resin A, there is introduced 298 parts of 4,4'-(2,2-butylidene)dibenzoic acid, 240 parts of soya fatty acids and 118 parts of glycerin. With constant stirring, the charge is heated gradually to about 245° C. and maintained at that temperature until esterification is substantially complete. The medium-oil modified alkyd resin, thus produced, has an acid number of 10.9, a Gardner-Holdt viscosity of $Z_{-2}$ at 50% solids in xylol at 25° C. and a color of 5 (Gardner 1933).

Example 3

20 parts (solids) of the fatty acid modified alkyd resin B and 2 parts of 3,3-dimethyl diphenyl methane-4,4'-diisocyanate are mixed together. After thorough mixing, films are drawn down on glass plates and baked for 1 hour at 150° C. The resultant film is hard, clear, tough and glossy.

ALKYD RESIN C

Into a suitable reaction vessel equipped as in alkyd resin A, there is introduced 284 parts of 4,4'-isopropylidene dibenzoic acid, 168 parts of lauric acid and 112 parts of glycerin. The resulting reaction mixture is heated to a temperature of 220 and 230° C. until esterification is substantially complete. The resulting short oil alkyd resin has an acid number of 8, a Gardner-Holdt viscosity between $Z_1$ and $Z_2$ in a 60% solids solution in xylol at 25° C. and a (Gardner 1933) color of from 3 to 4 as measured on said 60% xylol solution.

Example 4

20 parts of alkyd resin C (solids) are blended with 2 parts of 4,4'-dimethyl diphenyl methane-3,3'-diisocyanate and films are drawn down therefrom on panels and allowed to air dry overnight to produce clear, glossy, hard films.

Example 5

20 parts of alkyd resin B are blended with 2 parts of 2,2-bis(3-isocyanato-4-tolyl)butane. Films are drawn down from the resultant resinous composition and baked for 1 hour at 150° C. The resultant films are clear, glossy and hard.

Example 6

20 parts of alkyd resin A are blended with 3 parts of 3,3-bis(3-isocyanato-4-tolyl)pentane. Films are drawn down from the resulting resinous composition, one of which is baked for 1 hour at about 150° C. and the other is allowed to air dry overnight. In each instance, the resultant films are clear, glossy, hard and tough.

ALKYD RESIN D

Into a suitable reaction vessel equipped as in alkyd resin A, there is introduced 298 parts of 4,4'-(2,2-butylidene)dibenzoic acid, 134 parts of hexantriol-1,2,6 and 117 parts of hexandiol-1,6. The charge is heated gradually with constant stirring to about 200° C. and held at that temperature until esterification is substantially complete as indicated by an acid number of 10.

Example 7

15 parts of alkyd resin D (solids) are blended with 2 parts of 2,4-toluene diisocyanate and 1 part of a 50% aqueous solution of dioctyl sodium sulfosuccinate. The resultant mixture is poured into an open vessel and put into an oven at 60° C. Within 20 minutes, foaming is completed. Thereupon, the foam is cured for 1 hour at 120° C.

ALKYD RESIN E

Into a suitable reaction vessel equipped as in alkyd resin A, there is introduced 149 parts of 4,4'-(2,2-butylidene)dibenzoic acid, 365 parts of adipic acid and 368 parts of glycerin. The charge is heated gradually to a temperature of about 200–220° C. and heated at that temperature until an acid number of less than 12 is reached.

Example 8

15 parts of alkyd resin E (solids), 10 parts of 2,4-toluene diisocyanate and 1 part of a 50% aqueous solution of dioctyl sodium sulfosuccinate are blended together and mixed thoroughly. The resultant mixture is poured into an open vessel and put into an oven at 60° C. Within 20 minutes, foaming is completed. Thereupon, the foam is cured for 1 hour at 120° C. A 10 gram sample of the resinous composition foamed to a volume of 60 ccs.

ALKYD RESIN F

Into a suitable reaction vessel equipped as in alkyd resin A, there is introduced 142 parts of 4,4'-isopropylidene dibenzoic acid, 49 parts of maleic anhydride, 58 parts of hexandiol-1,6, and 134 parts of hexantriol-1,2,6. The charge is heated gradually with constant stirring to 190–200° C. and held at that temperature until an acid number of 12 is attained.

Example 9

30 parts of alkyd resin F (solids) are blended with 22 parts of 2,4-toluene diisocyanate and 2 parts of a 50% aqueous solution of dioctyl sodium sulfosuccinate. The mixed composition is placed in an open vessel in an oven at 60° C. for about 20 minutes and is then cured for 1 hour at 120° C.

It has been indicated hereinabove that the alkylidene dibenzoic acids used in the present invention may be reacted with polyisocyanates or that the alkylidene dibenzoic acids may be esterified with polyhydric alcohols and then reacted with the polyisocyanates. Among the polyhydric alcohols which may be used in the practice of the process of the present invention are ethylene glycol, diethylene glycol, propylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, the alkane diols such as butandiol-1,4, pentandiol-1,3, and the like. Quite obviously, these polyhydric alcohols may be used either singly or in combination with one another.

If it is desired to modify the alkylidene dibenzoic acid polyesters by reaction with an oily material, one may make use of any of the conventional glyceride oils, their fatty acids or the monoglycerides of said fatty acids. More particularly, one may make use of such oils as coconut oil, palm oil, babassu oil, murumuru oil, rape seed oil, mustard seed oil, olive oil, peanut oil, sesame oil, corn oil, cottonseed oil, soya oil, sunflower oil, walnut oil, linseed oil, castor oil, either raw or dehydrated, tung oil, oiticica oil, whale oil, menhaden oil, sardine oil, herring oil and the like. The fatty acids derived from said oils may also be used such as caprylic acid, capric acid, lauric acid, myristic acid, palmitic acid, stearic acid, arachidic acid, behenic acid, lignoceric acid, myristoleic acid, palmitoleic acid, oleic acid, linoleic acid, linolenic acid, elaeostearic acid, licanic acid, ricinoleic acid, erucic acid, and the like. Any of the monoglycerides of these acids may be used as well. These oils and/or their fatty acids and/or their monoglycerides may be used either or singly or in combination with one another.

If it is desired in the preparation of polyester resins used in the practice of the present invention to make use of other polycarboxylic acids other than the alkylidene dibenzoic acids, one may make use of such polycarboxylic acids which are free of nonbenzenoid unsaturation such as phthalic acid, oxalic acid, malonic acid, succinic acid, glutaric acid, sebacic acid, adipic acid, pimelic acid, suberic acid, azelaic acid, tricarballylic acid, citric acid, tartaric acid, malic acid and the like. If one wishes to introduce some measure of ethylenic unsaturation into the polyester molecule by use of an alpha-beta ethylenically unsaturated polycarboxylic acid, one may make use of such acids as maleic, fumaric, aconitic, itaconic and the like. Whenever available, these polycarboxylic acids, whether saturated or unsaturated, may be used in the form of their anhydrides. These acids, whether saturated or unsaturated and/or their anhydrides, may be used either singly or in combination with one another.

In preparing the compositions of the present invention, one may introduce a polyisocyanate or a polyisothiocyanate or mixed isocyanate isothiocyanate compounds into the alkylidene dibenzoic acid or its derivatives in order to prepare the novel resinous materials of the present invention. Among the polyisocyanates which may be used in the practice of the process of the present invention are hexamethylene diisocyanate, paraphenylene diisocyanate, 2,3-dimethyl-tetramethylene diisocyanate, decamethylene diisocyanate, hexamethylene diisothiocyanate, para,para'-diphenylene diisocyanate, 2-chlorotrimethylene diisocyanate, 5-nitro-1,3-phenylene diisocyanate, ethylene diisocyanate, dodecamethylene diisocyanate, butane-1,2,2-triisocyanate, ethylene diisothiocyanate, meta-phenylene diisocyanate, para-phenylene diisothiocyanate, hexamethylene-1-isocyanate-4-isothiocyanate, benzene-1,2,4-triisothiocyanate, polymethylene diisocyanates and diisothiocyanates such as trimethylene diisocyanate, tetramethylene diisocyanate, pentamethylene diisocyanate, etc., the corresponding isothiocyanates; alkylene diisocyanates and diisothiocyanates such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates such as ethylidene diisocyanate $$(CH_3CH(NCO)_2)$$

butylidene diisocyanate and the like.

Reference is made to the pending patent application of the instant application and his coinventor, namely, one Kenneth A. Kun, having the Serial No. 637,613, filed February 1, 1957, now abandoned, which discloses and claims certain novel polyisocyanates including polyisocyanates per se and polyisothiocyanates. Any of the polyisocyanates disclosed therein, may be used in the practice of the process of the present invention. Illustrative of these isocyanates are 2,2-bis(3-isocyanato-4-tolyl)propane; 2,2-bis(4-isocyanato-3-tolyl)propane; 2,2-bis(3-isocyanato-4-tolyl)butane; 2,2-bis(4-isocyanato-3-tolyl) butane; 3,3-bis(3-isocyanato-4-tolyl)pentane; 3,3-bis(3-isocyanato-4-tolyl)hexane; 4,4,-bis(3-isocyanato-4-tolyl) heptane; 4,4-bis(3-isocyanato-4-tolyl)octane; 5,5-bis(4-isocyanato-3-tolyl)nonane; 5,5-bis(3-isocyanato-4-tolyl) nonane; 2,2-bis(3-isothiocyanato-4-tolyl)propane; 2,2-bis(4-isothiocyanato-3-tolyl)propane; 2,2-bis(3-isothiocyanato-4-tolyl)butane; 2,2-bis(4-isothiocyanato-3-tolyl)butane; 3,3-bis(3-isothiocyanato-4-tolyl)pentane; 3,3-bis(3-isothiocyanato-4-tolyl)hexane; 4,4-bis(3-isothiocyanato-4-tolyl)heptane; 4,4-bis(3-isothiocyanato-4-tolyl)octane; 5,5-bis(4-isothiocyanato-3-tolyl)nonane; 5,5-bis(3-isothiocyanato-4-tolyl)nonane and the like.

If it is desired to prepare resinous materials by reacting a polyisocyanate with a polyester resin of an alkylidene dibenzoic acid, said polyester resin may be prepared by heat reacting the alkylidene dibenzoic acid and a polyhydric alcohol until esterification is substantially completed as is indicated by a comparatively low acid number. The acid number on the completion of esterification should be at least not greater than about 20 and preferably below about 10. It is possible, however, for certain purposes, to make use of polyester resinous materials of the class described which have a higher acid number such as 50 or even 100. In the general preparation of these polyester resins, whether oil modified or not, the amount of polyhydric alcohol should be at least stoichiometrically equivalent to the amount required to substantially completely esterify the alkylidene acid present and the oil acids, if any, present. It is preferred to use a slight excess of polyhydric alcohols such as about 10 to 20% over and beyond the stoichiometrical amount of polyhydric alcohol required to completely esterify the alkylidene dibenzoic acid.

In the practice of the process of the present invention, if it is desired to make resin foams, one should introduce into the reaction sphere a small quantity of water and preferably an aqueous solution of any of the available wetting agents such as the Aerosol OT, namely, dioctyl sodium sulfosuccinate, Aerosol MA, namely, dihexyl sodium sulfosuccinate, Aerosol AY, namely, diamyl sodium sulfosuccinate, Aerosol ID, namely, diisobutyl sodium sulfosuccinate, Aerosol OS, namely, isopropylnaphthalene sodium sulfonate, Aerosol AS, namely, isopropylnaphthalene sodium sulfonate. Additional wetting agents characterized by being esters of sulfodicarboxylic acids are shown to a considerably greater extent in the U.S. Patent No. 2,028,091.

The amount of polyisocyanate used in the practice of the process of the present invention may be varied over fairly wide limits such as comparatively small amounts in the order of magnitude of less than 1% such as one-tenth percent and five-tenths percent or in greater amounts such as 20% or even 100% by weight based on the total weight of the alkylidene dibenzoic acid or its esters. Another way of representing this range of proportions of the polyisocyanate to the alkylidene dibenzoic acids is to say that one may use ½ equivalent of the polyisocyanate for each reactive group in the alkylidene dibenzoic acid or its esters. These reactive groups in the derivatives will be either carboxyl groups or hydroxyl groups or mixtures thereof. In the isocyanate, the reactive group is, of course, the isocyanato group itself. Larger equivalents may be used such as 4 equivalents of the isocyanate per each reactive group in the alkylidene dibenzoic acid or its derivative.

If it is desired to accelerate the reaction between the alkylidene dibenzoic acid and/or its derivatives with the polyisocyanates, one may make use of such catalysts as tertiary organic bases such as pyridine, N-methylmorpholine, hexahydroxydimethyl aniline, methyl piperidine, dimethyl piperazine, tribenzylamine, tetramethyldiaminodipropyl ether, triethanolamine, tripropanolamine, tributylamine, dimethyl aniline, diethylethanolamine, ethyl diethanolamine, and the like. These catalytic materials may be used in the conventional catalytic amounts such as between about 0.01% and 0.5% by weight based on the total weight of alkylidene dibenzoic acid or alkylidene dibenzoic acid esters. Larger amounts such as up to about 5% of the catalyst may be used but caution should be exercised in overcatalyzing the reaction.

If it is desired to make a cross-linked resinous reaction product, one may make use of such materials as primary and secondary amines, both aromatic and aliphatic, including monoamines as well as polyamines. More specifically these cross-linking agents are methylamine, dimethylamine, butylamine, dipropylamine, benzylamine, ethylbenzylamine, triethylenediamine, tetraethylene pentamine, hexamethylene tetramine and the like. Additionally, one may make use of polyhydric alcohols containing at least two alcoholic hydroxy groups such as any of the polyhydric alcohols recited hereinabove. Additionally, one may make use of trialkanolamines such as triethanolamine, tripropanolamine, tributanolamine and the like. These cross-linking agents may be used in amounts varying between about 0.2% and 10% by weight based on the total weight of the alkylidene dibenzoic acids or their polyesters.

Illustrative of additional polyisocyanates which may be used in the practice of the process of the present invention are set forth in the U.S. Patents No. 2,620,516, 2,621,166, 2,625,531, 2,625,532.

I claim:

1. A composition of matter comprising the polymeric interreaction product of (1) a polyisocyanate and (2) the polyester reaction product of a polyhydric alcohol and a polycarboxylic acid having the general formula:

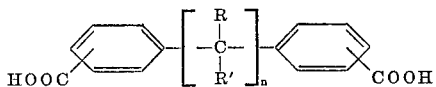

wherein R and R' are alkyl groups containing 1 to 4 carbon atoms and $n$ is a whole number consisting of 1 and 2, inclusive, wherein said polyisocyanate is devoid of any vinyl group.

2. A composition of matter comprising the polymeric interreaction product of (1) a polyisocyanate and (2) the polyester resin reaction product of a polyhydric alcohol and 4,4'-isopropylidene dibenzoic acid, wherein said polyisocyanate is devoid of any vinyl group.

3. A composition of matter comprising the polymeric interreaction product of (1) a polyisocyanate and (2) the polyester resin reaction product of a polyhydric alcohol and 4,4'-(2,2-butylidene)dibenzoic acid, wherein said polyisocyanate is devoid of any vinyl group.

4. A composition of matter comprising the polymeric interreaction product of (1) a polyisocyanate and (2) the polyester resin reaction product of a polyhydric alcohol and 4,4'-(3,3-pentylidene)dibenzoic acid, wherein said polyisocyanate is devoid of any vinyl group.

5. A composition of matter comprising the polymeric interreaction product of (1) a polyisocyanate and (2) the polyester resin reaction product of a polyhydric alcohol and 4,4'-(1,1,2,2-tetramethylethylene)dibenzoic acid, wherein said polyisocyanate is devoid of any vinyl group.

6. A process comprising reacting (1) a polyisocyanate and (2) the polyester reaction product of a polyhydric alcohol and a polycarboxylic acid having the general formula:

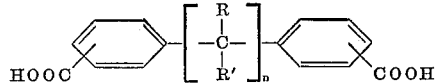

wherein R and R' are alkyl groups containing 1 to 4 carbon atoms and $n$ is a whole number consisting of 1 and 2, inclusive, wherein said polyisocyanate is devoid of any vinyl group.

7. A process comprising reacting (1) a polyisocyanate and (2) the polyester resin reaction product of a polyhydric alcohol and 4,4'-isopropylidene dibenzoic acid, wherein said polyisocyanate is devoid of any vinyl group.

8. A process comprising reacting (1) a polyisocyanate and (2) the polyester resin reaction product of a polyhydric alcohol and 4,4'-(2,2-butylidene)dibenzoic acid, wherein said polyisocyanate is devoid of any vinyl group.

9. A process comprising reacting (1) a polyisocyanate and (2) the polyester resin reaction product of a polyhydric alcohol and 4,4'-(3,3-pentylidene)dibenzoic acid, wherein said polyisocyanate is devoid of any vinyl group.

10. A process comprising reacting (1) a polyisocyanate and (2) the polyester resin reaction product of a polyhydric alcohol and 4,4'-(1,1,2,2-tetramethylethylene)dibenzoic acid, wherein said polyisocyanate is devoid of any vinyl group.

11. A composition of matter comprising the polymeric interreaction product of (1) a polyisocyanate and (2) the polyester reaction product of (a) a material selected from the group consisting of a glyceride oil, glyceride oil fatty acids and glyceride oil monoglycerides, (b) a polyhydric alcohol, and (c) a polycarboxylic acid having the general formula:

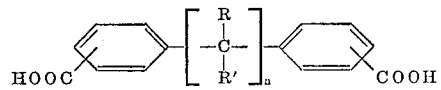

wherein R and R' are alkyl groups containing 1 to 4 carbon atoms and $n$ is a whole number consisting of 1 and 2, inclusive, wherein said polyisocyanate is devoid of any vinyl group.

12. A composition of matter comprising the polymeric interreaction product of (1) a polyisocyanate and (2) the polyester reaction product of (a) a material selected from the group consisting of a glyceride oil, glyceride oil fatty acids and glyceride oil monoglycerides, (b) a polyhydric alcohol, and (c) 4,4'-isopropylidene dibenzoic acid, wherein said polyisocyanate is devoid of any vinyl group.

13. A composition of matter comprising the polymeric interreaction product of (1) a polyisocyanate and (2) the polyester reaction product of (a) a material selected from the group consisting of a glyceride oil, glyceride oil fatty acids and glyceride oil monoglycerides, (b) a polyhydric alcohol, and (c) 4,4'-(2,2-butylidene)dibenzoic acid, wherein said polyisocyanate is devoid of any vinyl group.

14. A composition of matter comprising the polymeric interreaction product of (1) a polyisocyanate and (2) the polyester reaction product of (a) a material selected from the group consisting of a glyceride oil, glyceride oil fatty acids and glyceride oil monoglycerides, (b) a polyhydric alcohol, and (c) 4,4'-(3,3-pentylidene)dibenzoic acid, wherein said polyisocyanate is devoid of any vinyl group.

15. A composition of matter comprising the polymeric interreaction product of (1) a polyisocyanate and (2) the polyester reaction product of (a) a material selected from the group consisting of glyceride oil, glyceride oil fatty acids and glyceride oil monoglycerides, (b) a polyhydric alcohol, and (c) 4,4'-(1,1,2,2-tetramethylethylene)dibenzoic acid, wherein said polyisocyanate is devoid of any vinyl group.

16. A process comprising reacting (1) a polyisocyanate and (2) the polyester reaction product of (a) a material selected from the group consisting of a glyceride oil, glyceride oil fatty acids and glyceride oil monoglycerides, (b) a polyhydric alcohol, and (c) a polycarboxylic acid having the general formula:

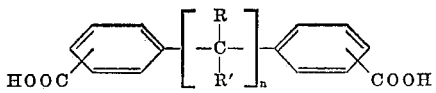

wherein R and R' are alkyl groups containing 1 to 4 carbon atoms and $n$ is a whole number consisting of 1 and 2, inclusive, wherein said polyisocyanate is devoid of any vinyl group.

17. A process comprising reacting (1) a polyisocyanate and (2) the polyester reaction product of (a) a material selected from the group consisting of a glyceride oil, glyceride oil fatty acids and glyceride oil monoglycerides, (b) a polyhydric alcohol, and (c) 4,4'-isopropylidene dibenzoic acid, wherein said polyisocyanate is devoid of any vinyl group.

18. A process comprising reacting (1) a polyisocyanate and (2) the polyester reaction product of (a) a material selected from the group consisting of a glyceride oil, glyceride oil fatty acids and glyceride oil monoglycerides, (b) a polyhydric alcohol, and (c) 4,4'-(2,2-butylidene)-dibenzoic acid, wherein said polyisocyanate is devoid of any vinyl group.

References Cited in the file of this patent

UNITED STATES PATENTS

| | | |
|---|---|---|
| 2,268,586 | Gilman | Jan. 6, 1942 |
| 2,282,827 | Rothrock | May 12, 1942 |
| 2,764,565 | Hoppe et al. | Sept. 25, 1956 |
| 2,794,822 | Schweitzer | June 4, 1957 |
| 2,808,391 | Pattison | Oct. 1, 1957 |
| 2,836,579 | Schweitzer | May 27, 1958 |
| 2,851,432 | Petropoulos | Sept. 9, 1958 |
| 2,851,437 | Petropoulos | Sept. 9, 1958 |

FOREIGN PATENTS

| | | |
|---|---|---|
| 744,027 | Great Britain | Jan. 25, 1956 |

OTHER REFERENCES

Ser. No. 397,741, Schlack (A.P.C.), published Apr. 20, 1943.

Phoenix: German application Ser. No. P11082, printed Jan. 19, 1956 (Kl. 39b 2204).